United States Patent
Dogan

(10) Patent No.: US 10,534,626 B2
(45) Date of Patent: Jan. 14, 2020

(54) METHODS FOR FACILITATING SELF-SERVICE AUTOMATION UTILITIES AND DEVICES THEREOF

(71) Applicant: JPMorgan Chase Bank, N.A., New York, NY (US)

(72) Inventor: Yavuz Ibrahim Dogan, Sugar Land, TX (US)

(73) Assignee: JPMORGAN CHASE BANK, N.A., New York, NY (US)

(*) Notice: Subject to any disclaimer, the term of this patent is extended or adjusted under 35 U.S.C. 154(b) by 19 days.

(21) Appl. No.: 15/996,734

(22) Filed: Jun. 4, 2018

(65) Prior Publication Data

US 2019/0370039 A1    Dec. 5, 2019

(51) Int. Cl.
  *G06F 9/46*    (2006.01)
  *G06F 9/455*   (2018.01)
  *G06F 9/451*   (2018.01)
  *G06F 9/445*   (2018.01)

(52) U.S. Cl.
  CPC ...... *G06F 9/45512* (2013.01); *G06F 9/44526* (2013.01); *G06F 9/451* (2018.02)

(58) Field of Classification Search
  None
  See application file for complete search history.

(56) References Cited

U.S. PATENT DOCUMENTS

| | | | |
|---|---|---|---|
| 2006/0218174 A1* | 9/2006 | Cook, III | G06F 16/284 |
| 2017/0270091 A1* | 9/2017 | Singh | G06F 17/276 |
| 2018/0254101 A1* | 9/2018 | Gilmore | G06T 11/206 |

\* cited by examiner

*Primary Examiner* — Gregory A Kessler
(74) *Attorney, Agent, or Firm* — Greenblum & Bernstein, P.L.C.

(57) ABSTRACT

Methods, non-transitory computer readable media, and unified command center (UCC) server devices that provide a graphical user interface (GUI) configured to dynamically display one or more parameter input fields for one or more parameters in response to selection of a command. The parameter input fields are identified based on stored command data for the selected command. Task data for a task is then obtained via the GUI. The task data includes at least an indication of the selected command, one or more values for the parameters received via the parameter input fields, and an indication of a database instance. A command line is generated based on the task data. The command line is automatically executed using stored core source code and a stored run command script for a platform associated with the database instance to initiate performance of the task on a target device hosting the database instance.

12 Claims, 6 Drawing Sheets

```
DECLARE @c_name VARCHAR(30), @c_desc VARCHAR(100),
        @c_text VARCHAR(500), @c_tags VARCHAR(100), @t_name VARCHAR(20),
        @p_overwrite CHAR(1), @c_id SMALLINT, @c_creator VARCHAR(30), @c_type CHAR(1),
        @str VARCHAR(30), @other_tools VARCHAR(150), @nl VARCHAR(2), @m_minutes SMALLINT,
        @min SMALLINT, @t_name2 VARCHAR(110)

SELECT  @c_creator    = "?",   -- Creator of UCC command
        @t_name       = "?",   -- UCC plugin name
        @other_tools  = "?",   -- Additional plugins this command is created for. <plugin>,<time_saved>
        @c_name       = "?",   -- UCC command name
        @c_type       = "?",   -- UCC command type: C=cmd S=script P=procedure K=O/S script T=display text.
        @c_desc       = "?",   -- UCC command description
        @c_tags       = "?",   -- UCC command tags.
        @p_overwrite  = "?",   -- Overwrite existing command or not Y=yes, anything else is NO.
        @nl           = CHAR(13) + CHAR(10),
        @m_minutes    = ?      -- # of minutes saved by this UCC cmd.

SELECT  @c_text       = "?"    -- UCC command text

SELECT  @c_id = c_id
FROM    tb_cc_cmd
WHERE   t_name = @t_name AND c_name = @c_name
IF @@rowcount > 0 BEGIN
        IF @p_overwrite = "Y"
                EXEC sp__cc_delete_cmd @t_name, @c_name
        ELSE BEGIN
                PRINT "ERROR : There is existing command with same name."
                PRINT "           SET @p_overwrite to 'y'"
                RETURN
        END
END IF NOT EXISTS (SELECT 1 FROM tb_cc_tools WHERE t_name = @t_name) BEGIN
        PRINT "ERROR : Invalid plug-in name: %1!", @t_name
        RETURN
END SELECT  @c_id = ISNULL(MAX(c_id), 0) + 1
FROM    tb_cc_cmd
WHERE   t_name = @t_name PRINT "Adding command. c_id - c_name : %1! - %2!", @c_id, @c_name -- Insert command info
INSERT tb_cc_cmd (t_name, c_id, c_name, c_desc, c_tags, c_text, c_type, c_creator, m_minutes, c_prod)
VALUES (@t_name, @c_id, @c_name, @c_desc, @c_tags, @c_text, @c_type, @c_creator, @m_minutes,1)

-- UCC Command Parameters
-- p_no : param #, p_name : parameter name, p_type : param type,
-- p_prompt=param prompt p_default=default value p_msg=optional param msg INSERT tb_cc_params (t_name,c_name,p_no,p_name,p_type,p_prompt, p_default, p_msg)
VALUES (@t_name, @c_name, 1, "@p_rdb", "C", "TR dbid or ds_name.db_name or .dbname", "null", null )

WHILE @other_tools IS NOT NULL AND
      EXISTS (SELECT 1 FROM tb_cc_cmd WHERE t_name=@t_name AND c_name = @c_name) BEGIN EXEC sp__cut_first @other_tools OUTPUT, @str OUTPUT
      IF @str IS NULL BREAK IF @str LIKE "%,%" BEGIN
              EXEC sp__cut_first @str OUTPUT, @t_name2 OUTPUT, ","
              SELECT @min = CONVERT(SMALLINT, @str )
      END ELSE
              SELECT @min = @m_minutes, @t_name2 = @str PRINT " "
      EXEC sp__cc_copy_cmd  @t_name, @c_name, @t_name2, NULL, 'Y', @min
```
← 34

FIG. 4

```
DECLARE @c_name VARCHAR(30), @c_desc VARCHAR(100),
        @c_text VARCHAR(500), @c_tags VARCHAR(100), @t_name VARCHAR(20),
        @p_overwrite CHAR(1), @c_id SMALLINT, @c_creator VARCHAR(30), @c_type CHAR(1),
        @str VARCHAR(30), @other_tools VARCHAR(150), @nl VARCHAR(2), @m_minutes SMALLINT,
        @min SMALLINT, @t_name2 VARCHAR(110)

SELECT  @c_creator     = "ibo",
        @t_name        = "ASE",
        @other_tools   = "SYB_AD.15,SYB_OPERATE.15" ,
        @c_name        = "DDL_Create_Procedure",
        @c_type        = "K",
        @c_desc        = "Generate CREATE PROCEDURE DDL for given procedure.",
        @c_tags        = "ddl create procedure",
        @p_overwrite   = "Y",
        @nl            = CHAR(13) + CHAR(10),
        @m_minutes     = 5

SELECT  @c_text        = "syb_ddl.ksh"

SELECT  @c_id = c_id
FROM    tb_cc_cmd
WHERE   t_name = @t_name AND c_name = @c_name
IF @@rowcount > 0 BEGIN
    IF @p_overwrite = "Y"
        EXEC sp__cc_delete_cmd @t_name, @c_name
    ELSE BEGIN
        PRINT "ERROR : There is existing command with same name."
        PRINT "           SET @p_overwrite to 'Y'"
        RETURN
    END
END IF NOT EXISTS (SELECT 1 FROM tb_cc_tools WHERE t_name = @t_name) BEGIN
    PRINT "ERROR : Invalid plug-in name: %1!", @t_name
    RETURN
END SELECT  @c_id = ISNULL(MAX(c_id), 0) + 1
FROM    tb_cc_cmd
WHERE   t_name = @t_name PRINT "Adding command. c_id - c_name : %1! - %2!", @c_id, @c_name -- Insert command info
INSERT tb_cc_cmd (t_name, c_id, c_name, c_desc, c_tags, c_text, c_type, c_creator, m_minutes, c_prod,c_download)
VALUES (@t_name, @c_id, @c_name, @c_desc, @c_tags, @c_text, @c_type, @c_creator, @m_minutes,1,"Y")

-- Insert parameters
INSERT tb_cc_params (t_name,c_name,p_no,p_name,p_type,p_prompt, p_default, ksh_param)
VALUES (@t_name, @c_name, 1, "@ds", "C", "<hidden>", "$pds", "-s @ds")

INSERT tb_cc_params (t_name,c_name,p_no,p_name,p_type,p_prompt, p_default, ksh_param)
VALUES (@t_name, @c_name, 2, "@dbuser", "C", "<hidden>", "$pdsuser", "-u @dbuser")

INSERT tb_cc_params (t_name,c_name,p_no,p_name,p_type,p_prompt, p_default, ksh_param)
VALUES (@t_name, @c_name, 3, "@dbname", "C", "Database Name", null, "-T P -D @dbname")

INSERT tb_cc_params (t_name,c_name,p_no,p_name,p_type,p_prompt, p_default, ksh_param)
VALUES (@t_name, @c_name, 4, "@tblname", "C", "Procedure Name", null, "-N @tblname")

WHILE @other_tools IS NOT NULL AND
      EXISTS (SELECT 1 FROM tb_cc_cmd WHERE t_name=@t_name AND c_name = @c_name) BEGIN EXEC sp__cut_first @other_tools OUTPUT, @str OUTPUT
    IF @str IS NULL BREAK IF @str LIKE "%.%" BEGIN
        EXEC sp__cut_first @str OUTPUT, @t_name2 OUTPUT, "."
        SELECT @min = CONVERT(SMALLINT, @str )
    END ELSE
        SELECT @min = @m_minutes, @t_name2 = @str PRINT " "
    EXEC sp__cc_copy_cmd  @t_name, @c_name, @t_name2, NULL, 'Y', @min
```

FIG. 5

METHODS FOR FACILITATING SELF-SERVICE AUTOMATION UTILITIES AND DEVICES THEREOF

FIELD

This technology generally relates to facilitating self-service utilities and, more particularly, to methods and devices for a universal self-service automation platform.

BACKGROUND

Self-service utilities are created to allow information technology (IT) professionals, such as database developers, to perform tasks that require authorization that the database developers do not have. In one example, a self-service utility may be created to allow a database developer to kill a session or connection on an Oracle platform, which would otherwise require an administrator privilege. Self-service utilities are also created to facilitate performance of relatively complex tasks, such as refreshing a database. Particular self-service utilities generally support only certain technologies or platforms (e.g., Oracle or SAP databases).

Accordingly, developers often need to learn usage, syntax, and script(s) for each available self-service utility in order to utilize the self-service utilities, which is undesirable when working across multiple technologies and platforms. Additionally, creating self-service utilities is currently inefficient. In particular, for each self-service utility, several challenges must be resolved including building security and risk controls around the utility, authorization management for target users, creating and maintaining the code required for the utility, training target users, and reporting and monitoring, for example.

SUMMARY

A method for facilitating self-service automation utilities, implemented by one or more unified command center (UCC) server devices, includes providing a graphical user interface (GUI) configured to dynamically display one or more parameter input fields for one or more parameters in response to selection of a command. The parameter input fields are identified based on stored command data for the selected command. Task data for a task is then obtained via the GUI. The task data includes at least an indication of the selected command, one or more values for the parameters received via the parameter input fields, and an indication of a database instance. A command line is generated based on the task data. The command line is automatically executed using stored core source code and a stored run command script for a platform associated with the database instance to initiate performance of the task on a target device hosting the database instance.

A UCC server device includes memory comprising programmed instructions stored thereon and one or more processors configured to be capable of executing the stored programmed instructions to provide a GUI configured to dynamically display one or more parameter input fields for one or more parameters in response to selection of a command. The parameter input fields are identified based on stored command data for the selected command. Task data for a task is then obtained via the GUI. The task data includes at least an indication of the selected command, one or more values for the parameters received via the parameter input fields, and an indication of a database instance. A command line is generated based on the task data. The command line is automatically executed using stored core source code and a stored run command script for a platform associated with the database instance to initiate performance of the task on a target device hosting the database instance.

A non-transitory computer readable medium having stored thereon instructions for facilitating self-service automation utilities includes executable code which when executed by one or more processors, causes the processors to provide a GUI configured to dynamically display one or more parameter input fields for one or more parameters in response to selection of a command. The parameter input fields are identified based on stored command data for the selected command. Task data for a task is then obtained via the GUI. The task data includes at least an indication of the selected command, one or more values for the parameters received via the parameter input fields, and an indication of a database instance. A command line is generated based on the task data. The command line is automatically executed using stored core source code and a stored run command script for a platform associated with the database instance to initiate performance of the task on a target device hosting the database instance.

This technology has a number of associated advantages including providing methods, non-transitory computer readable media, and UCC server devices that facilitate more efficient generation and utilization of self-service utilities. With this technology, new platforms can be plugged-in, and any number of tasks for the platforms can be automated, using standard or core source code that addresses common challenges. Database developers or other information technology (IT) professionals do not need to know any particular syntax or parameters, for example, in order to perform tasks on any number of platforms using self-service utilities, which are advantageously made available via a single uniform interface. Additionally, maintenance is advantageously streamlined with this technology since metadata used to perform tasks across different platforms is stored centrally.

BRIEF DESCRIPTION OF THE DRAWINGS

FIG. 4 is a source code snippet of an exemplary command template;

FIG. 5 is a source code snippet of exemplary command data for a command obtained using the command template of FIG. 4.

DETAILED DESCRIPTION

Figure 1:
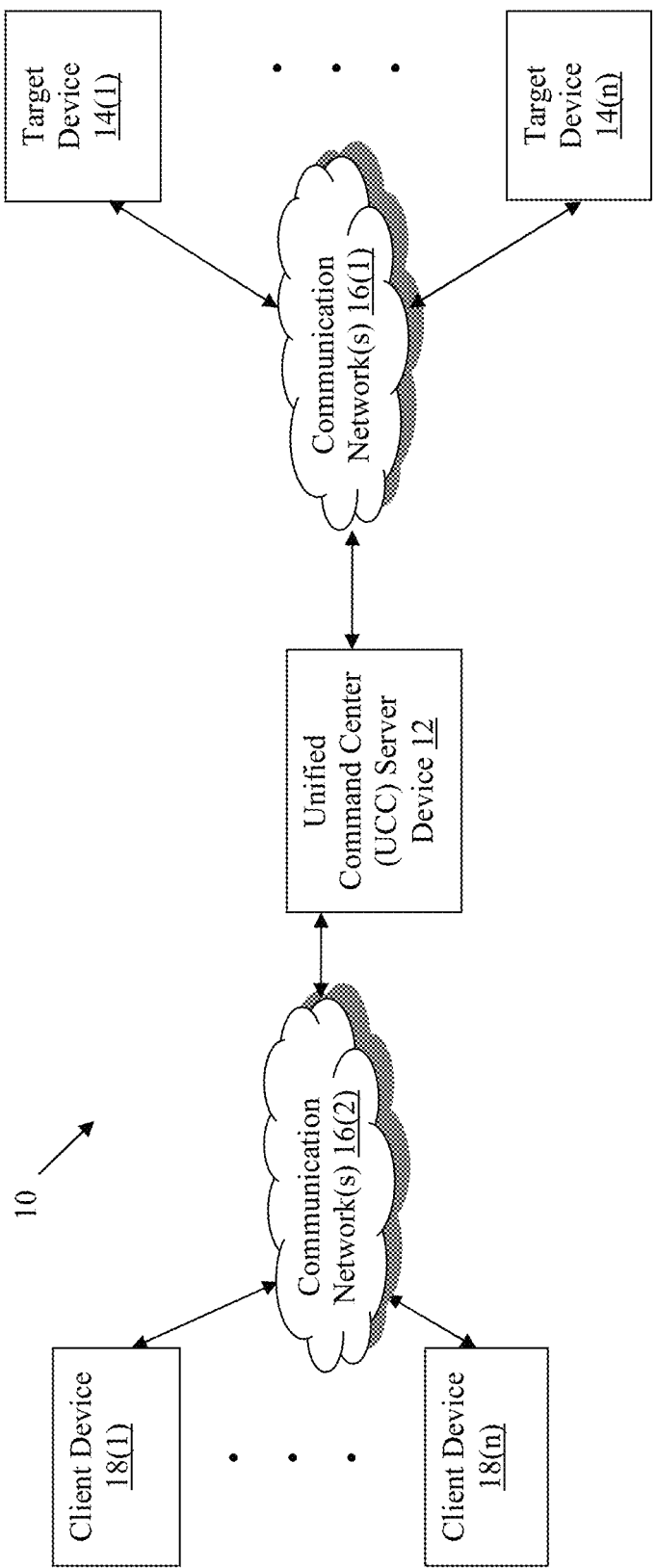
FIG. 1 is a block diagram of an exemplary network environment with an exemplary unified command center (UCC) server device.

Referring to FIG. 1, an exemplary network environment 10 with an exemplary unified command center (UCC) server device 12 is illustrated. The UCC server device 12 in this example is coupled to a plurality of target devices 14(1)-14(n) via communication network(s) 16(1) and a plurality of client devices 18(1)-18(n) via communication network(s) 16(2), although the UCC server device 12, target devices 14(1)-14(n), and client devices 18(1)-18(n) may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and UCC server devices that provide an improved, automated platform for establishing and executing self-service utilities for performing tasks on databases hosted by target devices.

Figure 2:
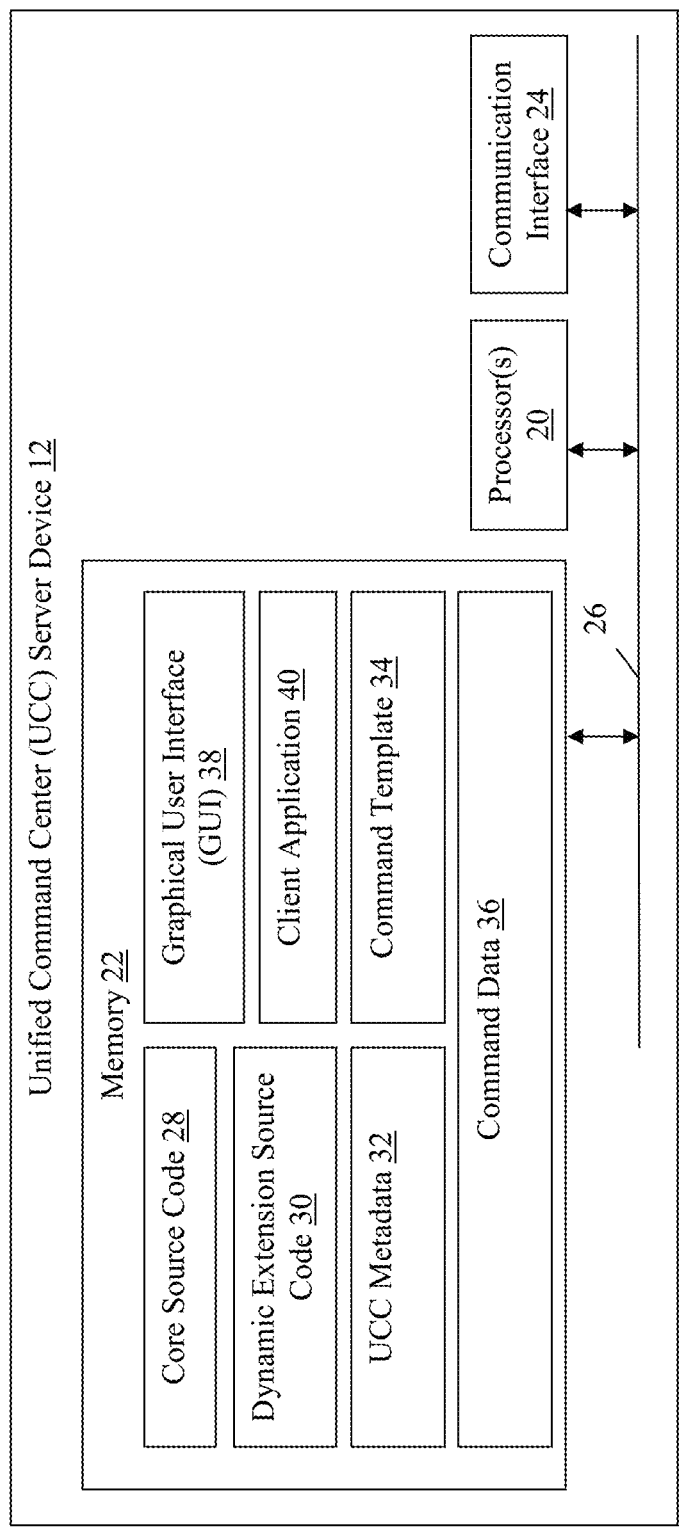
FIG. 2 is a block diagram of the UCC server device of FIG. 1.

Referring to FIGS. 1-2, the UCC server device 12 in this example includes one or more processors 20, a memory 22, and/or a communication interface 24, which are coupled together by a bus 26 or other communication link, although the UCC server device 12 can include other types and/or numbers of elements in other configurations. The processor(s) 20 of the UCC server device 12 may execute programmed instructions stored in the memory 22 for the any number of functions described and illustrated herein. The processor(s) 20 may include one or more CPUs or processing cores, for example, although other types of processor(s) can also be used.

The memory 22 of the UCC server device 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Accordingly, the memory 22 of the UCC server device 12 can store one or more applications that can include executable instructions that, when executed by the UCC server device 12, cause the UCC server device 12 to perform actions, such as to transmit, receive, or otherwise process network messages, perform tasks on the target devices 14(1)-14(n), and to perform other actions described and illustrated below with reference to FIGS. 3-6. The application(s) can be implemented as operating system extensions, modules, plugins, or components of other applications.

Even further, the application(s) may be operative in a cloud-based computing environment. The application(s) can be executed within or as virtual machine(s) or virtual server(s) that may be managed in a cloud-based computing environment. Also, the application(s), and even the UCC server device 12, may be located in virtual server(s) running in a cloud-based computing environment rather than being tied to one or more specific physical network computing devices. Also, the application(s) may be running in one or more virtual machines (VMs) executing on the UCC server device 12. Additionally, in one or more embodiments of this technology, virtual machine(s) running on the UCC server device 12 may be managed or supervised by a hypervisor.

In this particular example, the memory 22 of the UCC server device 12 includes core source code 28, dynamic extension source code 30, UCC metadata 32, at least one command template 34, command data 36 received via the command template 34, a graphical user interface (GUI), and a client application. In other examples, the UCC server device 12 can include other types or number of modules, applications, or databases.

The core source code 28 in this example provides functionality that can be used across many platforms and technologies (e.g., Oracle and SAP databases). Accordingly, the core source code 38 can be configured to, when executed, provide command processing and execution, authentication, auditing, monitoring, and/or alerting services. Users of the UCC server device 12 leverage the core source code 28 for functionality that is common to task execution across platforms, thereby providing a universal platform for self-service utilities, as described and illustrated in more detail later. Optionally, the core source code 28 also includes run command script(s) for built-in platform(s) that are integrated at deployment instead of introduced subsequent to deployment.

The dynamic extension source code 30 includes new automated task(s) and/or plugin(s), as well as support for new platform(s), which are added by an administrator subsequent to deployment. The support for new platform(s) can include run command script(s) for the new platform(s). Each of the run command script(s) for the built-in platform(s) of the core source code 28 and the new platform(s) of the dynamic extension source code 30 can be executed by the UCC server device 12 to execute commands on a particular one of the platforms in order to carry out a task on one of the target device 14(1)-14(n) hosting the platform or a database associated with the platform, for example.

The UCC metadata in this example includes default or standard plugins and associated commands and command parameters, authentication/security information, information regarding the target devices 14(1)-14(n), and encrypted passwords, for example. The information regarding the target devices 14(1)-14(n) can include a name, environment, and/or status of each of the target devices 14(1)-14(n), for example. The encrypted passwords can be used to access the target device 14(1)-14(n) and/or platforms or databases hosted therein, and can include administrator credentials, for example.

The command template 34 includes source code that can provide an interface for obtaining the command data 36. Accordingly, the command template 34 can define the inputs required to insert a new command for a particular platform as part of the dynamic extension source code 30. For example, the inputs can include a creator, name, type, description, and/or required parameters for a particular command, although other types and number of inputs can also be used. The command data 36 includes the particular values for the inputs of the command template 34 that are provided by an administrator, for example, for a particular new command associated with a platform. The command template 34 and command data 36 are described and illustrated in more detail later with reference to FIGS. 4 and 5, respectively.

The GUI in this example provides menus and dynamic parameter input fields for a database developer using one of the client devices 18(1)-18(n), for example, to select a plugin and a command within the plugin, as well as input the required parameter values for the selected command and an indication of a database instance hosted by one of the target devices 14(1)-14(n) on which the command is to be executed as part of performing a task on the database instance. The GUI is also configured to generate a command line based on the inputs received from the user and send the command line to the client application 40.

The GUI 38 can be provided by the client application 40, which can interpret and execute the generated command line in order to perform a task on one of the target devices 14(1)-14(n). The client application 40 can utilize a run command script in the core source code or dynamic extension source code 30 to execute command(s) associated with the task, and to provide other functionality to support execution of the task, as described and illustrated in more detail later. While the client application 40 is illustrated in this example as being integral with the UCC server device 12, the client application 40 can also be directly installed on the one or more of the target devices 14(1)-14(n) in other examples. In these examples, the client application 40 can receive the command line as directly input by a user of one of the target devices 14(1)-14(n) instead of as automatically generated based on input received via the GUI 38.

The communication interface 24 of the UCC server device 12 operatively couples and communicates between the UCC server device 12, target devices 14(1)-14(n), and/or client devices 18(1)-18(n), which are all coupled together by the communication network(s) 16(1) and 16(2), although other types and/or numbers of communication networks or systems with other types and/or numbers of connections and/or configurations to other devices and/or elements can also be used.

By way of example only, the communication network(s) 16(1) and/or 16(2) can include local area network(s) (LAN(s)) or wide area network(s) (WAN(s)), and can use TCP/IP over Ethernet and industry-standard protocols, although other types and/or numbers of protocols and/or communication networks can be used. The communication network(s) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Each of the target devices 14(1)-14(n) in this example includes one or more processors, a memory, and a communication interface, which are coupled together by a bus or other communication link, although other numbers and/or types of network devices could be used. The target devices 14(1)-14(n) in this example can host databases associated with one or more platforms (e.g., Oracle or SAP) that are accessible to, and maintained by, IT professionals utilizing the client devices 18(1)-18(n). Other types of software or platforms on which tasks can be executed can also be stored on the target devices 14(1)-14(n) in other examples.

Although the target devices 14(1)-14(n) are illustrated as single devices, one or more actions of the target devices 14(1)-14(n) may be distributed across one or more distinct network computing devices that together comprise one or more of the target devices 14(1)-14(n). Moreover, the target devices 14(1)-14(n) are not limited to a particular configuration. Thus, the target devices 14(1)-14(n) may contain a plurality of network computing devices that operate using a master/slave approach, whereby one of the network computing devices of the target devices 14(1)-14(n) operate to manage and/or otherwise coordinate operations of the other network computing devices.

The target devices 14(1)-14(n) may also operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The client devices 18(1)-18(n) in this example include any type of computing device that can interface with the UCC server devices 12 via the communication network(s) 16(1) in order to input and initiate commands associated with tasks to be performed on databases hosted by the target devices 14(1)-14(n), and thereby execute stored self-service utilities. Each of the client devices 18(1)-18(n) in this example includes a processor, a memory, and a communication interface, which are coupled together by a bus or other communication link, although other numbers and/or types of network devices could be used.

The client devices 18(1)-18(n) may run interface applications, such as standard web browsers, which may provide an interface to communicate with the UCC server device 12 via the communication network(s) 16(1) and/or the target devices 14(1)-14(n) via the communication network(s) 16(2). The client devices 18(1)-18(n) may further include a display device, such as a display screen or touchscreen, and/or an input device, such as a keyboard, for example, which can be used to receive and interface with the GUI. Accordingly, one or more of the client devices can be a smartphone, tablet, laptop, desktop, or another type of computing platform.

Although the exemplary network environment 10 with the UCC server device 12, target devices 14(1)-14(n), client devices 18(1)-18(n), and communication network(s) 16(1)-16(2) are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 10, such as the UCC server device 12, client devices 18(1)-18(n), or target devices 14(1)-14(n), for example, may be configured to operate as virtual instances on the same physical machine. In other words, one or more of the UCC server device 12, client devices 18(1)-18(n), or target devices 14(1)-14(n) may operate on the same physical device rather than as separate devices communicating through communication network(s). Additionally, there may be more or fewer UCC server devices, client devices, or target devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
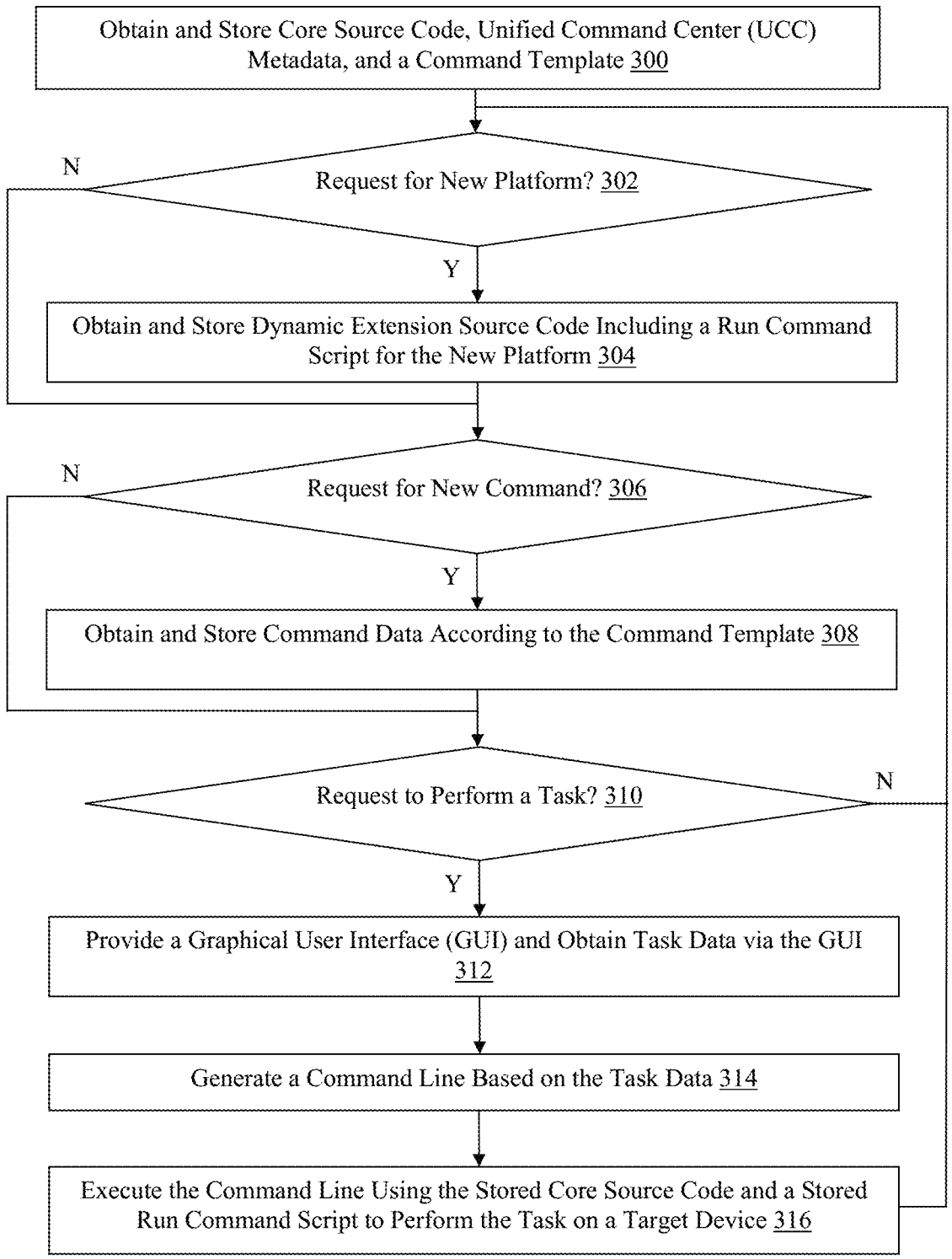
FIG. 3 is a flowchart of an exemplary method for facilitating self-service automation utilities.

An exemplary method of facilitating self-service automation utilities will now be described with reference to FIGS. 3-6. Referring more specifically to FIG. 3, a flowchart of an exemplary method for facilitating self-service automation utilities is illustrated. In step 300 in this example, the UCC server device 12 obtains the core source code 28, UCC metadata 32, and command template 34. Optionally, the core source code 28, UCC metadata 32, and command template 34 can be obtained from an administrator and stored in the memory 22, such as in one or more repositories or databases, although one or more of the core source code 28, UCC metadata 32, and command template 34 can also be obtained from other sources and/or stored elsewhere in the network environment 10.

The core source code 28 is configured to provide command processing and execution, authentication and auditing, monitoring, or alerting functionality for a plurality of platforms associated with database instances hosted by the target devices 14(1)-14(n). The UCC metadata 32 in this example includes standard or default plugins and associated commands and command parameters, as well as authentication/security information, information regarding the target devices 14(1)-14(n), and/or encrypted passwords. In one example, the UCC metadata 32 includes credentials for administrators of databases hosted by the target devices 14(1)-14(n), which can be used to perform tasks that require administrator privilege as part of the self-service utilities made available by the UCC server device 12.

The command template 34 is used to obtain command data 36 in this particular example, although other methods of obtaining the command data 36 can also be used in other examples. Referring more specifically to FIG. 4, a source code snippet defining an exemplary command template 34 is illustrated. The command template 34 defines the command data required for an administrator to submit a command that can be used to perform a task on one or more of the target devices 14(1)-14(n). The command template 34 in this example requires input of a creator, name, associated plugin(s), name, type, description, tags, whether to overwrite any existing commands, parameters, and a location of the command text, although other types of template fields for input of command data can also be used in other examples.

Referring back to FIG. 3, in step 302, the UCC server device 12 determines whether a request to add a new platform has been received, such as from an administrator using one of the client devices 18(1)-18(n), for example. The request can be received via a provided GUI or another interface by way of example. While the UCC server device 12 optionally includes built-in support for particular platforms in the core source code 28, an administrator may want to add support for an additional platform corresponding to a new database hosted by one of the target devices 14(1)-14(n), for example. Exemplary platforms can include Oracle, SAP IQ or ERP, Cassandra, Linux, MongoDB, MS SQL, or HP Vertica, although other types of platforms can also be supported by the UCC server device 12.

If the UCC server device 12 determines in step 302 that a request for a new platform has been received, then the Yes branch is taken and the UCC server device 12 proceeds to step 304. In step 304, the UCC server device 12 obtains at least a run command script for the new platform. In order to add the new platform, the interface via which the request to add a new platform was received can be used by the UCC server device 12 to obtain the run command script for the new platform. The run command script is configured to, when executed by the UCC server device 12, execute a command to perform a task on a database corresponding to the associated platform that is hosted by one or more of the target devices 14(1)-14(n). Accordingly, the run command scripts are platform-specific and can be stored in the dynamic extension source code 30 in the memory 22.

Subsequent to obtaining and storing the run command script for the new platform, or if the UCC server device 12 determines in step 302 that a request for a new platform has not been received and the No branch is taken, the UCC server device 12 proceeds to step 306. In step 306, the UCC server device 12 determines whether a request to add a new command has been received, such as from an administrator using one of the client devices 18(1)-18(n) for example. The request can be received via a provided GUI or another interface and the command can be associated with any platform supported by the UCC server device 12 (e.g., for which a run command script is stored in the memory 22). If the UCC server device 12 determines that a request for a new command has been received in step 306, then the Yes branch is taken to step 308.

In step 308, the UCC server device 12 obtains, and stores in the memory 22, command data 36 according to the command template 34. Accordingly, the UCC server device 12 in this example provides or executes the command template 34, which is used to facilitate input of the command data 36 by an administrator, including at least optional and/or required parameters for the associated command.

Referring more specifically to FIG. 5, a source code snippet of the command data 36 for a command obtained using the command template 34 of FIG. 4 is illustrated. The command in this example is a "data definition language (DDL) create procedure" that can be executed to perform a task on a Sybase platform. The command text is located in a file "syb_ddl.ksh," which can be retrieved by the run command script for the Sybase platform as part of performing a task that requires execution of the script. The script is also associated with "SYB_AD" and SYB_OPERATE_15" PLUGINS. Additionally, the command data 36 for the "DDL create procedure" command defines command parameters including "ds," "dbser," dbname," and "tblname."

Referring back to FIG. 3, subsequent to obtaining and storing the command data 36 in step 308, or if the UCC server device 12 determines in step 306 that a request to add a new command has not been received and the No branch is taken, the UCC server device 12 proceeds to step 310. In step 310, the UCC server device 12 determines whether a request to perform a task has been received, such as from an administrator using one of the client devices 18(1)-18(n) for example. The request can be received by the client application 40 via a provided GUI or another interface, and can be in the form of a request for the GUI 38.

In this example, the request is received from a database developer using one of the client devices 18(1)-18(n) and the task is to be performed on a database associated with a platform hosted by one of the target devices 14(1)-14(n). Since the database developer does not have administrator privilege or credentials in order to execute command(s) associated with the requested task, the database developer can use the self-service utility of the UCC server device 12 to do so, as described and illustrated in more detail with reference to steps 312-316. Accordingly, if the UCC server device 12 determines that a request to perform a task has been received, then the Yes branch is taken to step 312.

In step 312, the UCC server device 12 provides the GUI 38 to the one of the client devices 18(1)-18(n) in response to the received request to perform a task and obtains task data via the GUI 38. The task data in this example includes at least an indication of at least selected command, value(s) for command parameter(s) received via parameter input field(s), and an indication of a database instance on which the command should be executed. The command can be selected via drop-down menu(s), for example, which include selectable indications of plugins and, upon selection of a plugin, command(s) associated with the selected plugin.

In this example, the GUI 38 is configured to dynamically display the parameter input fields for the command parameter(s) in response to selection of a command. The parameter input fields can be identified based on the stored command data 36 for the selected command, which includes an indication of the particular parameters associated with the selected command. The database instance can also be selected, or provided via a text input field, for example, and other methods of obtaining command selection(s), command parameter(s), and/or a database instance can also be used in other examples.

In step 314, the UCC server device 12 generates a command line based on the task data. The command line can be generated by the client application 40 upon receiving the task data submitted via the GUI 38. The command line can be text corresponding to a particular syntax that is interpretable by the run command script for the platform associated with the database instance indicated in the obtained task data.

In step 316, the UCC server device 12 executes the command line using the stored core source code 28 and a stored run command script in the dynamic extension source code 40 to initiate performance of the task on one of the target devices 14(1)-14(n) hosting the database instance indicated in the task data. Accordingly, the client application 40 executing on the UCC server device 12 in this example automatically performs a task on a database instance in response to receiving a selection of a command, command parameter(s), and an indication of the database instance. The database developer interfacing with the GUI 38 advantageously does not need to know the particular syntax or scripts required to execute the command, or even the particular required command parameter(s).

In examples in which the command required administrator privilege, the client application 40 executed on the UCC server device 12 can further execute the command line using an administrator account for the platform or the database instance indicated in the task data. The credentials associated with the administrator account can be stored in, and retrieved from, the UCC metadata 32 in order to facilitate the execution of the command as part of performing the task via the self-service utility. Subsequent to executing the command line in step 316, or if the UCC server device 12 determines in step 310 that a request to perform a task has not been received and the No branch is taken, the UCC server device 12 proceeds back to step 302 in this example.

Figure 6:
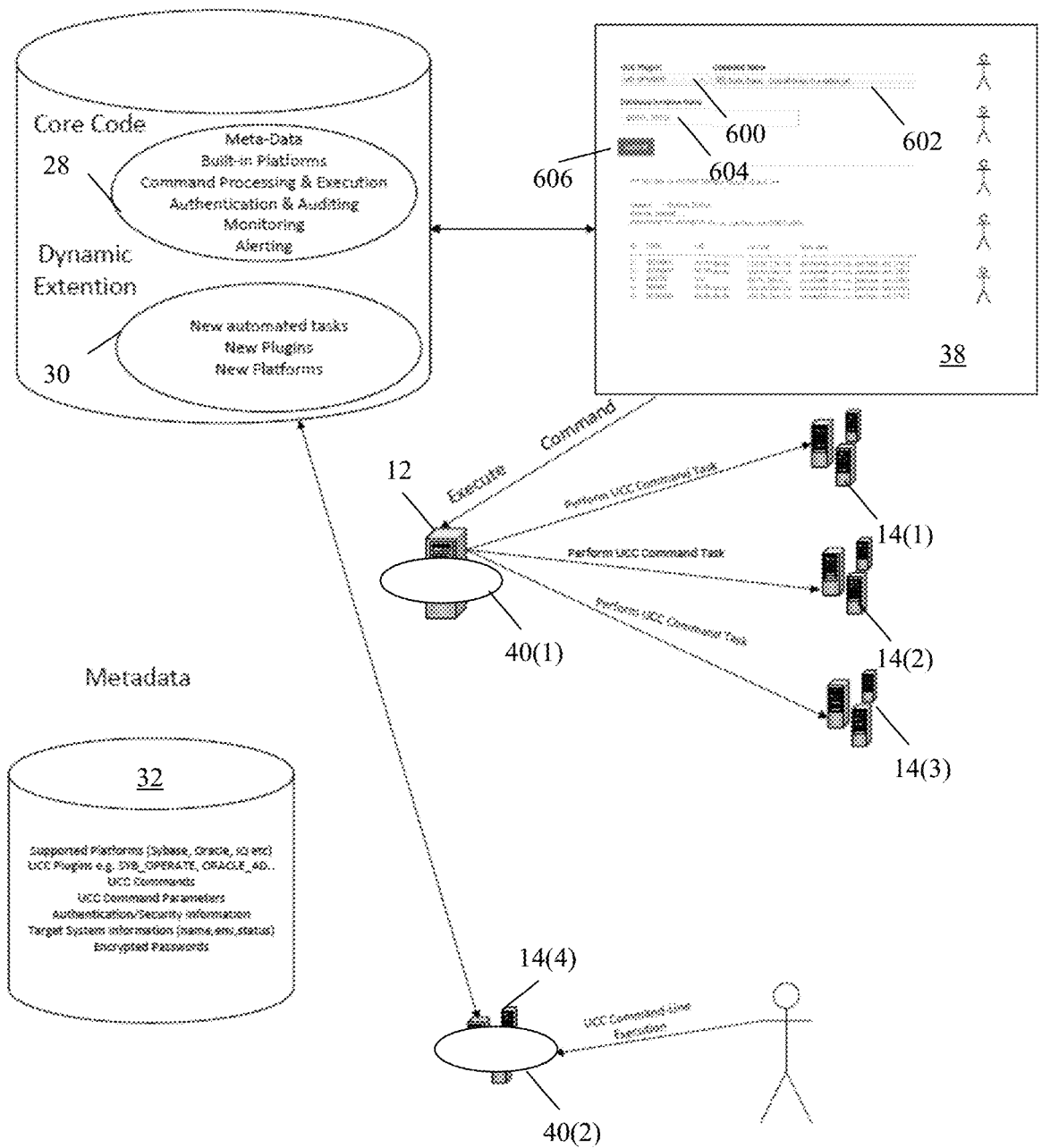
FIG. 6 is a flow diagram of an exemplary method for facilitating self-service automation utilities.

Referring more specifically to FIG. 6, a flow diagram of an exemplary method for facilitating self-service automation utilities is illustrated. In this example, the UCC server device 12 hosts a client application 40(2) and is coupled to target devices 14(1), 14(2), and 14(3). A user of one of the client devices 18(1)-18(n) can request the GUI 38, which is optionally provided by the UCC server device 12, although the GUI 38 can be hosted by one or more other devices in other examples. The user can then use menus 600 and 602 to select a plugin and a command associated with the selected plugin, respectively. The GUI further includes a text input field 604 for receiving a name or indication of a database instance.

Upon selection of one of the commands in the command menu 602, the GUI 38 is configured to dynamically display input fields for command parameters (not shown). The parameters required for the selected command can be retrieved from command data 36, which can be included in the core source code 28 or dynamic extension source code 30, for example. A user of the one of the client devices 18(1)-18(n) can then enter the command parameters and select the submit button 606 in this example to submit the task data.

Upon selection of the submit button, the GUI 38 utilizes the submitted task data, and optionally one or more of the core source code 28, dynamic extension source code, or UCC metadata 32, to construct a command line, which is sent to the client application 40(1) executing on the UCC server device 12 for execution, resulting in the performance of a task on one of the target devices 14(1), 14(2), or 14(3).

In another example, the task data can be sent to the client application 40(1) executing on the UCC server device 12 by the GUI 38 and the client application 40(1) can generate and execute the command line utilizing the core source code 28, dynamic extension source code 30, and/or UCC metadata 32. In yet another example, a user of one of the client device 18(1)-18(n) can enter and submit a command line directly to the client application 40(2), which is executing on the target device 14(4). In this example, the client application 40(2) executes the command line to perform the task on the target device 14(4).

Accordingly, with this technology, an automated self-service utility platform is provided that support any number of tasks for multiple technologies and types of databases. In particular, core source code is leveraged to provide functionality, such as security and risk control and reporting and monitoring, irrespective of the particular platform so that new self-service utilities can be created more efficiently. Additionally, new tasks can be added relatively efficiently and users (e.g., database developers) do not need to know any command syntax or parameters in order to initiate a task. Moreover, a single uniform GUI for all tasks and centrally stored metadata facilitate adding new tasks without requiring new deployments or releases, as well as efficient maintenance of source code.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating self-service automation utilities implemented by one or more unified command center (UCC) sever devices, the method comprising:
providing a graphical user interface (GUI) configured to dynamically display one or more parameter input fields for one or more parameters in response to selection of a command, the parameter input fields identified based on stored command data for the selected command;
obtaining task data for a task via the GUI, the task data comprising at least an indication of the selected command, one or more values for the parameters received via the parameter input fields, and an indication of a database instance;
generating a command line based on the task data; and
automatically executing the command line using stored core source code and a stored run command script for a platform associated with the database instance to initiate performance of the task on a target device hosting the database instance,
wherein the selected command is associated with a plug-in, the GUI further comprises one or more menus, and the method further comprises providing the GUI to a client device and receiving another selection of the plugin and the selection of the command from the client device and via the menus.

2. The method as set forth in claim 1, further comprising automatically executing the command line further using an administrator account for the platform or the database instance and stored credentials associated with the administrator account.

3. The method as set forth in claim 1, wherein the stored core source code is configured to provide command processing and execution, authentication and auditing, monitoring, or alerting for the platform and one or more other platforms associated with one or more other database instances hosted by the target device or one or more other target devices.

4. The method as set forth in claim 1, further comprising providing a command template and receiving the command data via the command template, the command data comprising at least an indication of the parameters associated with the selected command.

5. A unified command center (UCC) server device, comprising memory comprising programmed instructions stored thereon and one or more processors configured to be capable of executing the stored programmed instructions to:
provide a graphical user interface (GUI) configured to dynamically display one or more parameter input fields for one or more parameters in response to selection of a command, the parameter input fields identified based on stored command data for the selected command;
obtain task data for a task via the GUI, the task data comprising at least an indication of the selected command, one or more values for the parameters received via the parameter input fields, and an indication of a database instance;
generate a command line based on the task data; and
automatically execute the command line using stored core source code and a stored run command script for a platform associated with the database instance to initiate performance of the task on a target device hosting the database instance,
wherein the selected command is associated with a plug-in, the GU1 further comprises one or more menus, and the one or more processors are further configured to be capable of executing the stored programmed instructions to provide the GUI to a client device and receive another selection of the plugin and the selection of the command from the client device and via the menus.

6. The UCC server device as set forth in claim 5, wherein the one or more processors are further configured to be capable of executing the stored programmed instructions to automatically execute the command line further using an administrator account for the platform or the database instance and stored credentials associated with the administrator account.

7. The UCC server device as set forth in claim 5, wherein the stored core source code is configured to provide command processing and execution, authentication and auditing, monitoring, or alerting for the platform and one or more other platforms associated with one or more other database instances hosted by the target device or one or more other target devices.

8. The UCC server device as set forth in claim 5, wherein the one or more processors are further configured to be capable of executing the stored programmed instructions to provide a command template and receive the command data via the command template, the command data comprising at least an indication of the parameters associated with the selected command.

9. A non-transitory machine-readable medium having stored thereon instructions for facilitating self-service automation utilities comprising executable code which when executed by one or more processors, causes the one or more processors to:
provide a graphical user interface (GUI) configured to dynamically display one or more parameter input fields for one or more parameters in response to selection of a command, the parameter input fields identified based on stored command data for the selected command;
obtain task data for a task via the GUI, the task data comprising at least an indication of the selected command, one or more values for the parameters received via the parameter input fields, and an indication of a database instance;
generate a command line based on the task data; and
automatically execute the command line using stored core source code and a stored run command script for a platform associated with the database instance to initiate performance of the task on a target device hosting the database instance,
wherein the selected command is associated with a plug-in, the GUI further comprises one or more menus, and the executable code when executed by the processors further causes the one or more processors to provide the GUI to a client device and receive another selection of the plugin and the selection of the command from the client device and via the menus.

10. The non-transitory machine-readable medium as set forth in claim 9, wherein the executable code when executed by the processors further causes the one or more processors to automatically execute the command line further using an administrator account for the platform or the database instance and stored credentials associated with the administrator account.

11. The non-transitory machine-readable medium as set forth in claim 9, wherein the stored core source code is configured to provide command processing and execution, authentication and auditing, monitoring, or alerting for the platform and one or more other platforms associated with one or more other database instances hosted by the target device or one or more other target devices.

12. The non-transitory machine-readable medium as set forth in claim 9, wherein the executable code when executed by the processors further causes the one or more processors to provide a command template and receive the command data via the command template, the command data comprising at least an indication of the parameters associated with the selected command.

* * * * *